(12) United States Patent
Balachandran et al.

(10) Patent No.: US 10,924,937 B2
(45) Date of Patent: Feb. 16, 2021

(54) VALIDATION OF PAL PROTECTION AREAS

(71) Applicant: TELEFONAKTIEBOLAGET LM ERICSSON (PUBL), Stockholm (SE)

(72) Inventors: Kumar Balachandran, Pleasanton, CA (US); Virgil Cimpu, Ottawa (CA); Tomas Hedberg, Stockholm (SE); Mats Buchmayer, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 41 days.

(21) Appl. No.: 16/300,542

(22) PCT Filed: May 11, 2017

(86) PCT No.: PCT/IB2017/052780
§ 371 (c)(1),
(2) Date: Nov. 9, 2018

(87) PCT Pub. No.: WO2017/195152
PCT Pub. Date: Nov. 16, 2017

(65) Prior Publication Data
US 2019/0215698 A1 Jul. 11, 2019

Related U.S. Application Data

(60) Provisional application No. 62/334,993, filed on May 11, 2016.

(51) Int. Cl.
*H04W 4/00* (2018.01)
*H04W 16/14* (2009.01)
(Continued)

(52) U.S. Cl.
CPC ......... *H04W 16/14* (2013.01); *H04W 16/10* (2013.01); *H04W 28/26* (2013.01); *H04W 72/0453* (2013.01); *H04W 88/12* (2013.01)

(58) Field of Classification Search
CPC . H04W 16/14; H04W 16/10; H04W 72/0453; H04W 88/12; H04W 28/26
(Continued)

(56) References Cited

U.S. PATENT DOCUMENTS

| 2009/0161617 | A1* | 6/2009 | Abedi | H04W 16/10 370/329 |
| 2009/0298522 | A1* | 12/2009 | Chaudhri | H04W 16/14 455/509 |
| 2017/0041802 | A1* | 2/2017 | Sun | H04W 72/044 |

FOREIGN PATENT DOCUMENTS

| WO | 2015048756 A1 | 4/2015 |
| WO | 2015057811 A2 | 4/2015 |
| WO | 2015085163 A1 | 6/2015 |

OTHER PUBLICATIONS

Dolan, Use Case 2—Check Proposed Grant with other SAS, Wireless Innovation Forum Contribution, May 11, 2016.

* cited by examiner

*Primary Examiner* — Mang Hang Yeung

(57) ABSTRACT

According to some embodiments, a method for use in a first spectrum access system (SAS) server of authorizing spectrum access comprises: receiving, from a second SAS, information about one or more priority access license (PAL) protection areas (PPAs) served by the second SAS; receiving a spectrum grant request on behalf of one of a first PPA or a first general authorized access (GAA) user; determining whether granting the spectrum grant request may interfere with a second PPA geographically proximate the one of the first PPA or the first GAA user, wherein the second PPA is served by the second SAS; and granting or denying the spectrum grant request based at least in part on the interference determination. The interference determination may comprise modeling the radio environment within the second (Continued)

PPA and surrounding areas based on the spectrum grant request to determine whether an aggregate interference level exceeds a threshold.

20 Claims, 13 Drawing Sheets

(51) Int. Cl.
    *H04W 28/26*     (2009.01)
    *H04W 16/10*     (2009.01)
    *H04W 72/04*     (2009.01)
    *H04W 88/12*     (2009.01)

(58) Field of Classification Search
    USPC ........................................................ 370/329
    See application file for complete search history.

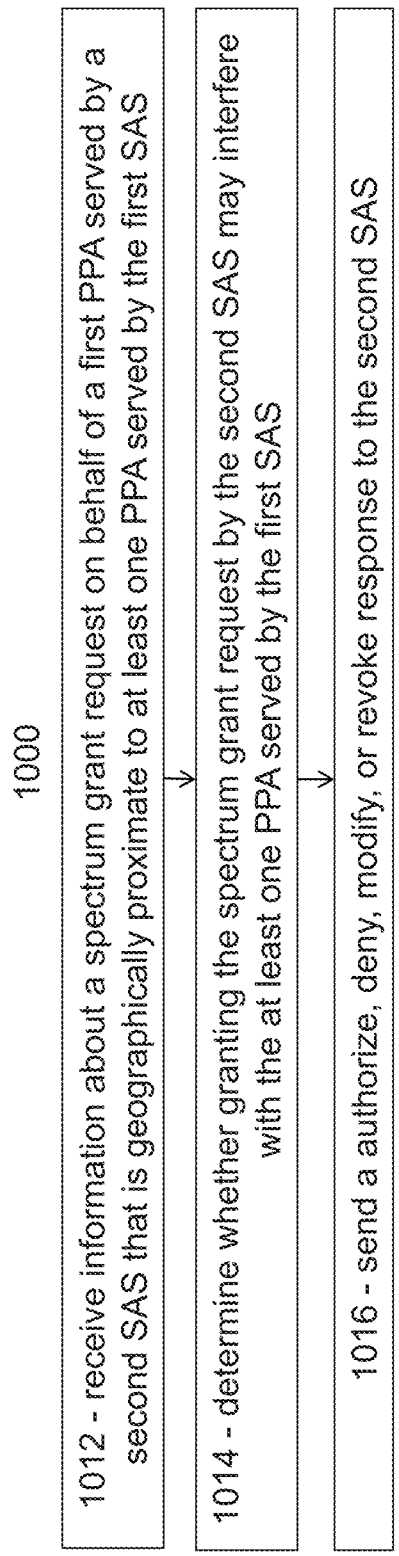

1012 - receive information about a spectrum grant request on behalf of a first PPA served by a second SAS that is geographically proximate to at least one PPA served by the first SAS 1014 - determine whether granting the spectrum grant request by the second SAS may interfere with the at least one PPA served by the first SAS 1016 - send a authorize, deny, modify, or revoke response to the second SAS

VALIDATION OF PAL PROTECTION AREAS

RELATED APPLICATIONS

This application is a 371 of International Application No. PCT/IB2017/052780, filed May 11, 2017, which claims the benefit of U.S. Application No. 62/334,993, filed May 11, 2016, the disclosures of which are fully incorporated herein by reference.

TECHNICAL FIELD

Particular embodiments are directed to wireless communications and, more particularly, to validation of spectrum allocation using priority access license (PAL) protection areas (PPAs).

INTRODUCTION

Mobile cellular networks have evolved over four generations of standards that operate over a wide range of frequency bands over the three decades prior to 2016. The predominant fourth generation cellular standard is the E-UTRA air interface and is part of the Long Term Evolution (LTE) upgrade path for the Third Generation Partnership Project (3GPP) family of specifications. LTE and E-UTRA are often used interchangeably and are referred to herein as LTE. The LTE specification is the latest generation of the family that includes global system for mobile communication (GSM)/enhanced data for GSM evolution (EDGE) within the GSM/EDGE radio network (GERAN), and wideband code division multiple access (WCDMA)/high speed packet access (HSPA) or the universal terrestrial radio access (UTRA) forming part of universal mobile telecommunications service (UMTS).

Spectrum is the lifeblood of modern cellular communication. Current building practices for wireless mobile communications focus on designing systems for wide area coverage in frequency bands that roughly extend between 400 MHz to 6 GHz, although no physical limitation strictly limits such systems to that range. The traffic growth on mobile networks has grown to the point where the mobile industry is consistently starved for spectrum.

The mobile industry has also created a role for spectrum within the economics of the industry. A large fraction of spectrum assigned for commercial mobile services has been via competitive auctions by regulators. Operators who submit winning bids for spectrum gain economic value from using the spectrum for serving mobile traffic. In return, regulators benefit from having a licensee who is motivated to utilize the spectrum in a productive manner by deploying systems in a way that covers a large fraction of a served population (e.g., up to 95% of subscribers).

Each generation of wireless technology has improved the metrics underlying spectrum efficiency, typically measured as area efficiency and denominated in the ratio data rate supported per unit bandwidth per cell ((b/s)/Hz/cell). Many regulators, such as the Federal Communications Commission (FCC) in the U.S., the Ofcom in the U.K., and the European Conference of Postal and Telecommunications Administrations (CEPT), balance the concerns that the demand for spectrum does not starve other services of spectrum, and yet the demand for more spectrum for mobile services be served by the regulatory process. An appeal of serving the mobile industry arises from the natural ability of that industry to directly benefit from the revenue potential of using spectrum. The revenue potential, however, cannot be an excuse to deny other industries access to spectrum. Regulators walk a fine line in effecting a balance. Thus, improving access to spectrum by means of sharing of spectrum is of much interest to regulators.

In unlicensed bands, access to spectrum is usually opportunistic and sharing occurs by means such as etiquette or polite coexistence. Recently, sharing spectrum using licensed shared access (LSA) or authorized shared access (ASA) has been of interest. Such systems usually propose a division of rights of use, which may be based on time of use or geographical constraints between mobile operators and an incumbent user.

A typical use of this scenario is to enable use of a band that is available for licensed users in some markets, but is being restricted in others because of incumbents, such as radar or satellite systems. Incumbent systems can be protected around the area of deployment, while authorization for mobile infrastructure can be granted in such a way that aggregate interference from mobile systems towards the incumbent is limited to an acceptable level of noise rise or performance degradation. In LSA, the mobile operator is licensed to operate in permitted or authorized areas, and is the reasonable regulatory approach to ASA.

The introduction of licensed shared access (LSA) in the 2.3 GHz band facilitates binary sharing between the incumbent, namely terrestrial radar stations in France for example, and LTE with the aid of a spectrum repository known as the LSA repository. Such regulation aims at unlocking spectrum designated as an International Mobile Telecommunications (IMT) band in the International Telecommunications Union (ITU) in markets, and subsequently offered a band designation in 3GPP, namely Band 40.

In the United States, a Presidential Memorandum directing the FCC to identify federal spectrum for release to mobile services resulted in a report by the Presidential Council of Advisors on Science and Technology (PCAST) that recommended that spectrum held by the federal Government be released to the mobile industry in a three-tier sharing arrangement. This memorandum has resulted in FCC regulations codified in the Report and Order for the Citizen's Broadband Radio Service (CBRS) defined for the 3550-3700 MHz band.

As in the PCAST report, the CBRS defines three tiers of sharing, with higher tiers providing higher priority of access to spectrum than the lower ones. In general, multiple tiers of users can be defined, although three tiers are a pragmatic choice. The assignment of channels to different tiers and related configurations are performed by a geolocation database and policy management system known as the Spectrum Access System (SAS).

In the CBRS, naval radar in littoral waters and commercial Fixed Satellite Service (FSS) comprise the incumbents. The second tier consists of Priority Access Licenses (PALs), and the third tier comprises opportunistic users known as general authorized access (GAA) users. Incumbent radar activity in the CBRS is dynamic, while FSS (space-to-earth) is static. The SAS is charged with protecting incumbents and PALs. In addition, the SAS authorizes spectrum for GAA users. An example CBRS is illustrated in FIG. 1.

FIG. 1 is a block diagram illustrating an example CBRS architecture. CBRS network 10 includes three major components: citizen's broadband service devices (CBSD) 12 serving a set of end user devices 14, SAS 16, and environmental sensing component (ESC) 18.

According to FCC rules, the CBSD is a logical component that represents a deployed radio or a set of radio nodes that can be located and registered in a geolocation database. It is convenient to regard the CBSD as a single radio or antenna site and its associated location. This is the working assumption in the predominant standardization activity carried out by the WinnForum. As a particular example, CBSD 12 may comprise a base station such as an LTE eNB, and end user devices 14 may comprise a wireless device such as an LTE user equipment (UE).

SAS 16 is a geolocation database and a spectrum policy manager that is charged with interfacing with associated CBSDs 12. SAS 16 protects incumbents and higher tier users from interference using means such as propagation modeling and geographic or temporal isolation. Multiple SASs 16 may serve different sets of CBSDs 12 in the same geographical area. The interface between SASs 16 may be used to share information regarding corresponding CBSD 12 activity in a given geographical area.

FIG. 2 illustrates an example of three tier sharing in the CBRS facilitating coexistence of incumbents, PAL users and GAA users. The incumbent systems in the 3550-3700 MHz band are coastal and terrestrial radar and FSS. The coastal regions are covered by the Environmental Sensing Component (ESC) made up of a set of sensors and a detection system that will detect the presence of radar from a distance of approximately 65 nautical miles (approximately 120 km) from the shoreline. A detection event may cause the SAS to reconfigure CBSDs placed within defined exclusion zones near the coastline. Reconfiguration may include termination of transmission rights for a CBSD, and may include reduction of power or reallocation of new spectrum.

The band allows the establishment of 0-7 PALs for each of over 74,000 census tracts in the United States as established in the 2010 census. The PALs may be associated with spectrum allocations by the SAS within the range 3550-3650 MHz and correspond to a 10 MHz assignment per license. The SAS may try to place multiple PALs adjacent to each other if so preferred by the CBSD.

A PAL user can protect a registered deployment of CBSDs within a PAL Protection Area (PPA) that is bounded by a contour representing a −96 dBm signal level. A PPA can overlap parts of multiple census tracts. While a PPA is atomically defined with respect to the coverage of a single CBSD, a composite PPA can be constructed by combining the coverage areas of geographically proximate CBSDs as shown in FIG. 3.

FIG. 3 illustrates an example PAL protection area based on a composite of associated CBSDs. The PAL protection areas are determined on the basis of a composite coverage of associated CBSDs as, for example, a set of vertices of a polygon located on a map.

FIG. 3 illustrates a simple PPA constructed as a set of vertices of a polygon (e.g., each vertex located as latitude, longitude and optionally an altitude above mean sea level or ground level). The PPA is restricted to lie within a coverage contour for the CBSD signal. A maximum coverage is determined by the −96 dBm/10 MHz contour. All SASs should have a consistent methodology for determining coverage. The PPA is typically claimed by the CBSD towards the serving SAS, and the SAS authorizes the PPA after validation of the claim against the PAL.

The SAS only protects the PAL to an aggregate interference level of −80 dBm. In the case of an LTE deployment, this means that the usable coverage contour may be much smaller than the PPA, especially if the interference level is at the limit, and a CBSD may not be able to operate close to receiver sensitivity. A PAL is protected within the bounds of the PPA, but co-channel assignments to GAA users within the census tract are possible if the SAS can determine that the interference limits within the PPA will not be exceeded. Such frequency allocations may occur from several SASs, especially in census tracts within highly populated metropolitan areas. Some examples are illustrated in FIG. 4.

FIGS. 4A-C illustrate protection criteria for PALs. The illustrated protection areas are examples according to the FCC Report and Order.

In FIG. 4A, operator A operates service area 40 in tract 1. Operator A holds a PAL for tract 1 and has deployed a CBSD. Tract 2 does not include a licensee. The CBSD deployed by operator A may operate at full power.

In FIG. 4B, operator A operates service area 40 in tract 1. Operator A holds a PAL for tract 1 and has deployed a CBSD. Operator B operates service area 42 in tract 2. Operator B holds a PAL for tract 2. Operator B also holds PAL protection area 44. The CBSD deployed by operator A is power controlled to prevent interference with operator B's PAL protection area 44.

In FIG. 4C, operator A operates service area 40 in tract 1. Operator A holds a PAL for tract 1 and has deployed a CBSD. Operator B operates service area 42 in tract 2. Operator B holds a PAL for tract 2. Operator B also holds PAL protection area 44. The CBSD deployed by operator A is power controlled to prevent interference with operator B's PAL protection area 44.

One of the problems with protecting PAL use within registered PPAs is the distributed nature of spectrum allocation among multiple SASs to unrelated client CBSDs. One objective of the WinnForum is to keep each SASs operation independent and autonomous in respect to serving its client CBSDs. In the case of PAL management, such an approach causes problems. The basic problem is that a PAL belongs to a specific licensee, who has a business relationship with a particular SAS. Yet, the rules allow other SASs to decide whether opportunistic or PAL use of co-channel and adjacent channel spectrum can occur in geographically proximate areas for unrelated CBSDs. Fully autonomous allocation of spectrum to CBSDs in the entire CBRS requires distributed agreement between multiple SASs on the level of interference in the PPA.

The alternatives described in the Introduction section are not necessarily alternatives that have been previously conceived or pursued. Therefore, unless otherwise indicated herein, the alternatives described in the Introduction section are not prior art and are not admitted to be prior art by inclusion in the Introduction section.

SUMMARY

The embodiments described herein facilitate a spectrum access system (SAS) for administering a priority access license (PAL) to oversee and approve grants issued to citizen's broadband service devices (CBSDs) in the proximity of a protected CBSD. The embodiments described herein may improve consistency regarding interference computation and simplify protection of a CBSD holding a PAL license.

According to some embodiments, a method for use in a first spectrum access system (SAS) server of authorizing spectrum access comprises: receiving, from a second SAS, information about one or more priority access license (PAL) protection areas (PPAs) served by the second SAS; receiving a spectrum grant request on behalf of one of a first PPA or a first general authorized access (GAA) user; determining whether granting the spectrum grant request may interfere with a second PPA geographically proximate the one of the first PPA or the first GAA user, wherein the second PPA is served by the second SAS; and granting or denying the spectrum grant request based at least in part on the determination of whether granting the spectrum grant request may interfere with the second PPA.

In particular embodiments, the received information about the one or more PPAs served by the second SAS comprises one or more of: a PPA boundary contour for each of the one or more PPAs; a frequency range allocated to each of the one or more PPAs; a number of citizen's band service devices (CBSDs) associated with each of the one or more PPAs; a location of CBSDs associated with each of the one or more PPAs; and the power level of the CBSDs associated with each of the one or more PPAs.

In particular embodiments, determining whether granting the spectrum grant request may interfere with the second PPA comprises: modeling the radio environment within the second PPA and surrounding areas based on the spectrum grant request to determine an aggregate interference level; and determining the aggregate interference level exceeds an interference threshold (e.g., −80 dBm). Modeling the radio environment may comprise applying empirical assumptions of one or more possible propagation characteristics for the environment. Modeling the radio environment may comprise selectively applying one of an Okumura-Hata model or an Irregular Terrain Model (ITM). Modeling the radio environment may comprise receiving measured signal levels or interference levels from one or more CBSDs, or end-user devices served by the one or more CBSDs.

In particular embodiments, upon determining that granting the spectrum grant request may interfere with the second PPA, the method further comprises sending information about the spectrum grant request to the second SAS; receiving, from the second SAS server, a spectrum grant response authorizing or denying the spectrum grant request; and granting or denying the spectrum grant request based on the response from the second SAS. In other embodiments, upon determining that granting the spectrum grant request may interfere with the second PPA, the method further comprises denying the spectrum grant request. Upon determining that granting the spectrum grant request may not interfere with the second PPA: the method further comprises granting the spectrum grant request; and sending information about the spectrum grant request to the second SAS. The method may include receiving, from the second SAS, a spectrum grant response denying or modifying the spectrum grant request; and revoking or modifying the granted spectrum grant request.

In particular embodiments, the information about the spectrum grant request comprises one or more of: a geographical location of a CBSD associated with the one of the first PPA or the first GAA user; a height of an antenna used by the CBSD; a power level of the CBSD; and a frequency allocation for the CBSD.

According to some embodiments, a method for use in a first SAS server of authorizing spectrum access comprises: receiving, from a second SAS, information about a spectrum grant request on behalf of a first PPA served by the second SAS that is geographically proximate to at least one PPA served by the first SAS; determining whether granting the spectrum grant request by the second SAS may interfere with the at least one PPA served by the first SAS; and sending a authorize, deny, modify, or revoke response to the second SAS.

According to some embodiments, first spectrum access system (SAS) operable to authorize spectrum access comprises a memory coupled to a processor. The processor is operable to: receive, from a second SAS, information about one or more PPAs served by the second SAS; receive a spectrum grant request on behalf of one of a first PPA or a first general authorized access (GAA) user; determine whether granting the spectrum grant request may interfere with a second PPA geographically proximate the one of the first PPA or the first GAA user, wherein the second PPA is served by the second SAS; and grant or deny the spectrum grant request based at least in part on the determination of whether granting the spectrum grant request may interfere with the second PPA.

In particular embodiments, the processor is operable to: model the radio environment within the second PPA and surrounding areas based on the spectrum grant request to determine an aggregate interference level; and determine the aggregate interference level exceeds an interference threshold (e.g., −0 dBm).

In particular embodiments, the processor is operable to: upon determining that granting the spectrum grant request may interfere with the second PPA, send information about the spectrum grant request to the second SAS; receive, from the second SAS, a spectrum grant response authorizing or denying the spectrum grant request; and grant or deny the spectrum grant request based on the response from the second SAS.

In particular embodiments, the processor is operable to: upon determining that granting the spectrum grant request may interfere with the second PPA, deny the spectrum grant request; upon determining that granting the spectrum grant request may not interfere with the second PPA: grant the spectrum grant request; and send information about the spectrum grant request to the second SAS.

In particular embodiments, the processor is operable to: receive, from the second SAS, a spectrum grant response denying or modifying the spectrum grant request; and revoke or modify the granted spectrum grant request.

According to some embodiments, a first SAS server operable to authorize spectrum access comprises a memory coupled to a processor. The processor is operable to: receive, from a second SAS, information about a spectrum grant request on behalf of a first PPA served by the second SAS that is geographically proximate to at least one PPA served by the first SAS; determine whether granting the spectrum grant request by the second SAS may interfere with the at least one PPA served by the first SAS; and send a authorize, deny, modify, or revoke response to the second SAS.

In particular embodiments, the processor is operable to: model the radio environment within the second PPA and surrounding areas based on the received information about the spectrum grant request to determine an aggregate interference level; and determine the aggregate interference level exceeds an interference threshold (e.g., −80 dBm).

According to some embodiments, a first SAS server operable to authorize spectrum access comprises a receiving module, a determining module, and a sending module. The receiving module is operable to: receive, from a second SAS, information about one or more priority PPAs served by the second SAS; receive a spectrum grant request on behalf of one of a first PPA or a first GAA user. The determining module is operable to determine whether granting the spectrum grant request may interfere with a second PPA geographically proximate the one of the first PPA or the first GAA user, wherein the second PPA is served by the second SAS. The sending module is operable to grant or deny the spectrum grant request based on the determination of whether granting the spectrum grant request may interfere with the second PPA.

In particular embodiments, the receiving module is operable to receive, from a second SAS, information about a spectrum grant request on behalf of a first PPA served by the second SAS that is geographically proximate to at least one PPA served by the first SAS. The determining module is operable to determine whether granting the spectrum grant request by the second SAS may interfere with the at least one PPA served by the first SAS. The sending module is operable to send a authorize, deny, modify, or revoke response to the second SAS.

Also disclosed is a computer program product. The computer program product comprises instructions stored on non-transient computer-readable media which, when executed by a processor, perform the acts of receiving, from a second SAS, information about one or more PPAs served by the second SAS; receiving a spectrum grant request on behalf of one of a first PPA or a first GAA user; determining whether granting the spectrum grant request may interfere with a second PPA geographically proximate the one of the first PPA or the first GAA user, wherein the second PPA is served by the second SAS; and granting or denying the spectrum grant request based at least in part on the determination of whether granting the spectrum grant request may interfere with the second PPA.

Another computer program product comprises instructions stored on non-transient computer-readable media which, when executed by a processor, perform the acts of receiving, from a second SAS, information about a spectrum grant request on behalf of a first PPA served by the second SAS that is geographically proximate to at least one PPA served by the first SAS; determining whether granting the spectrum grant request by the second SAS may interfere with the at least one PPA served by the first SAS; and sending a authorize, deny, modify, or revoke response to the second SAS.

Particular embodiments may exhibit some of the following technical advantages. For example, particular embodiments may create a strong relationship between a PAL licensee and its chosen serving SAS. The relationship enables the CBSDs in a PAL protection area (PPA) to be assured a quality to the spectrum allocation that is not possible with a completely autonomous approach to channel allocation among multiple SASs.

In particular embodiments, a first SAS is in control of a first PPA and is responsible for coexistence protection on behalf of its client. Some embodiments ensure that client privacy is not violated by sharing detailed information on all CBSDs among the entire set of SASs, but rather only the CBSDs deemed to be potential interferers to a PPA. Particular embodiments do not require each SAS to give up privacy for their clients if such a client must be accommodated in an area that will cause interference to a valid licensee of spectrum.

Particular embodiments may minimize data exchange. Some embodiments facilitate a distributed organization of SASs.

Particular embodiments may include a SAS that manages or validates aggregate interference calculation for associated PPAs. In some embodiments a centralized approach to the control may be used, while another approach may keep validation central, but uses distributed modeling of interference. Variations in the degree of autonomy have been identified. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which:

FIGS. 9 and 10 are flow diagrams illustrating example methods in a SAS server, according to particular embodiments;

DETAILED DESCRIPTION

Figure 1:
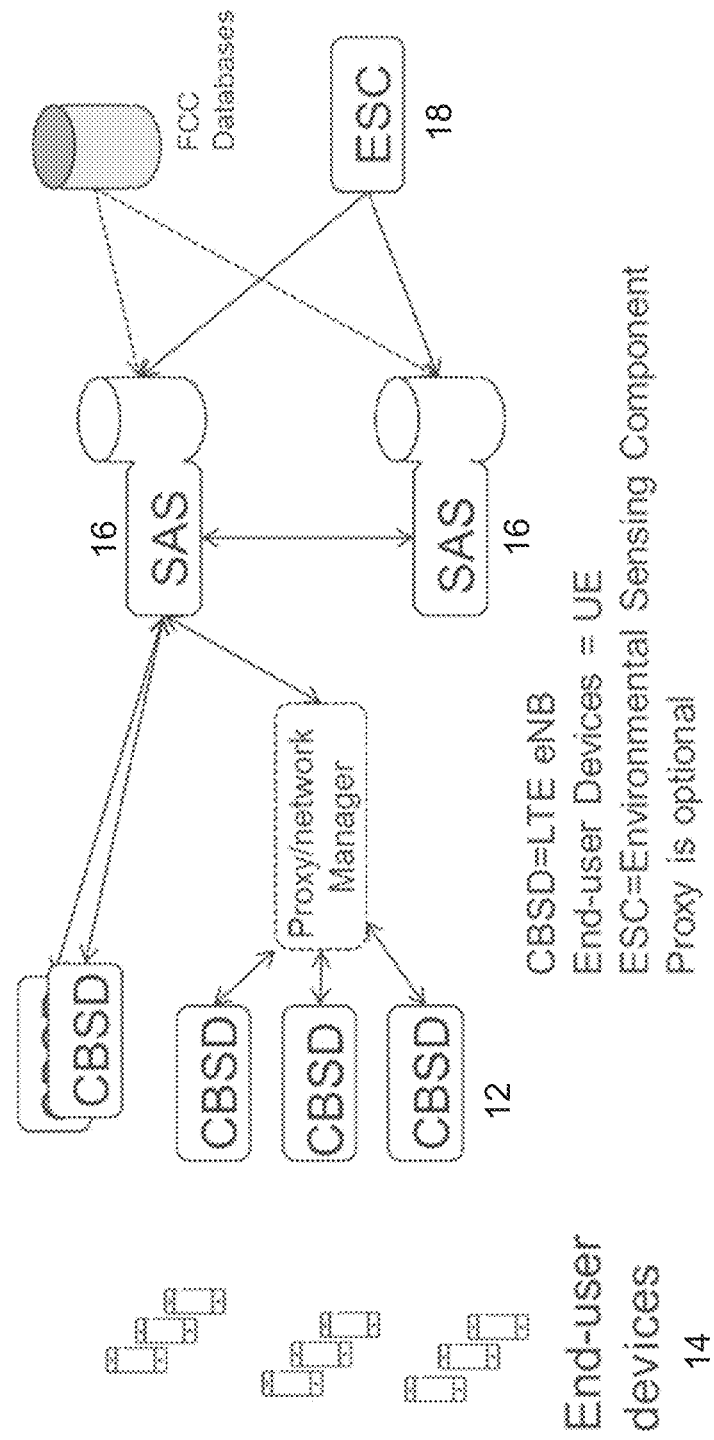
FIG. 1 is a block diagram illustrating an example CBRS architecture.
Figure 2:
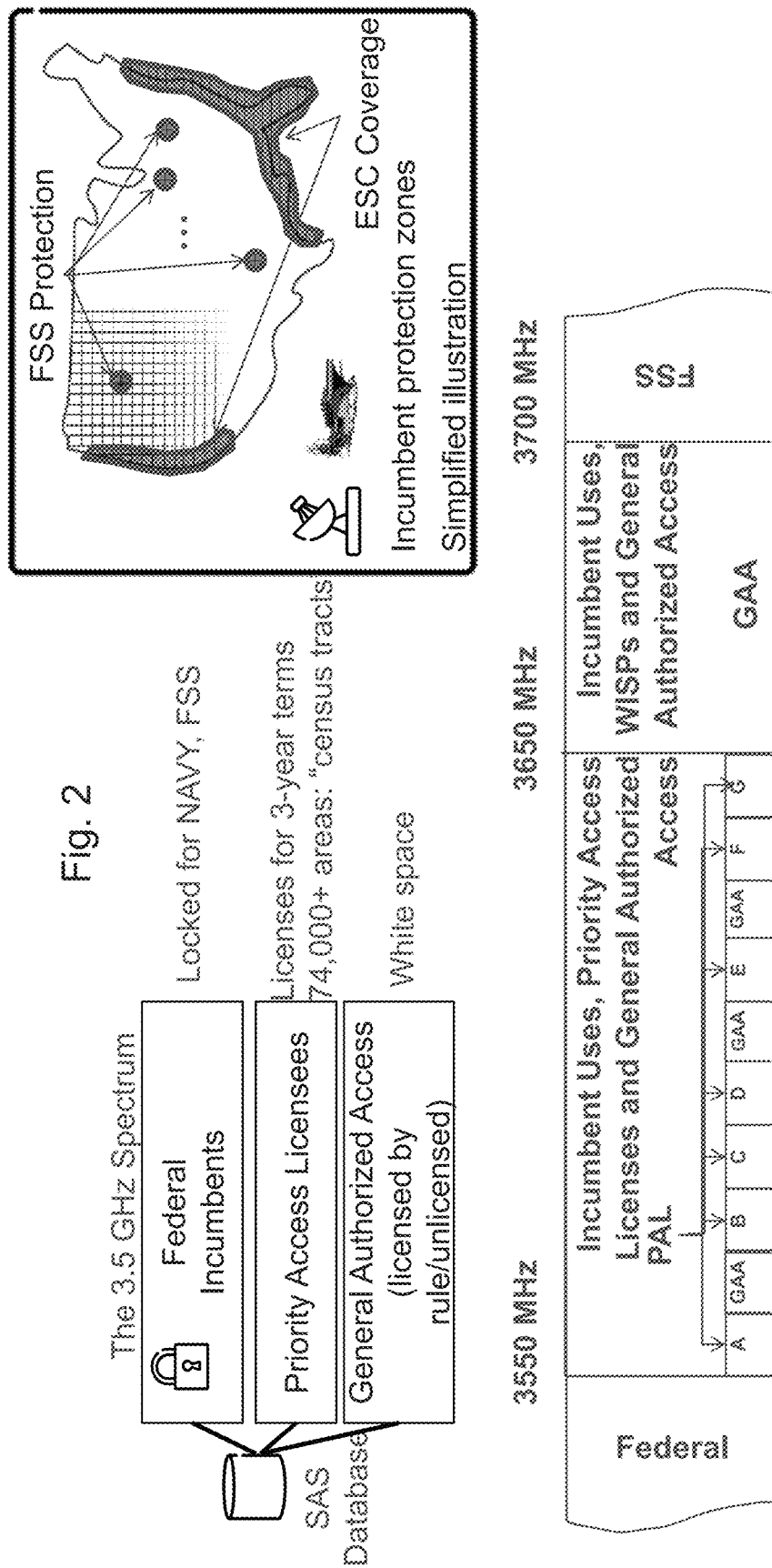
FIG. 2 illustrates an example of three tier sharing in the CBRS facilitating coexistence of incumbents, PAL users and GAA users.
Figure 3:
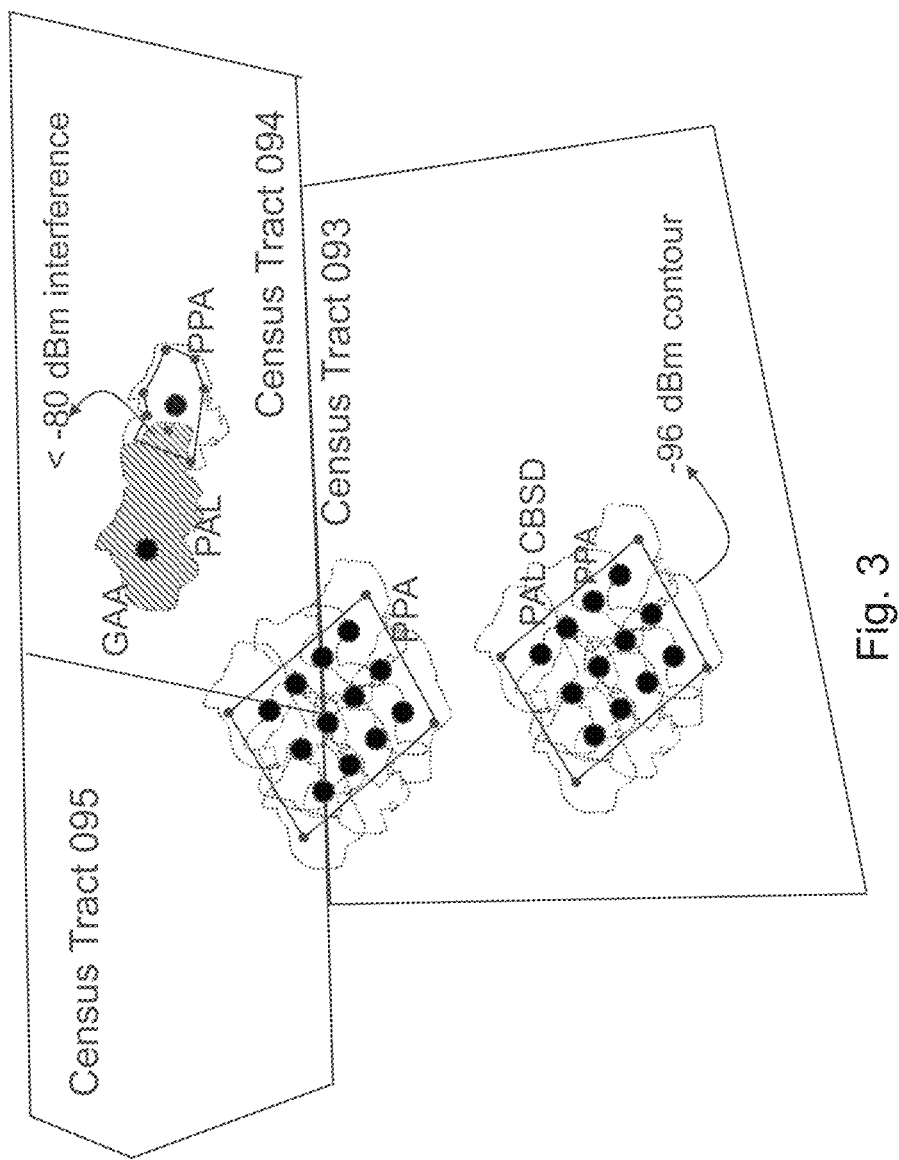
FIG. 3 illustrates an example PAL protection area based on a composite of associated CBSDs.
Figure 4A:
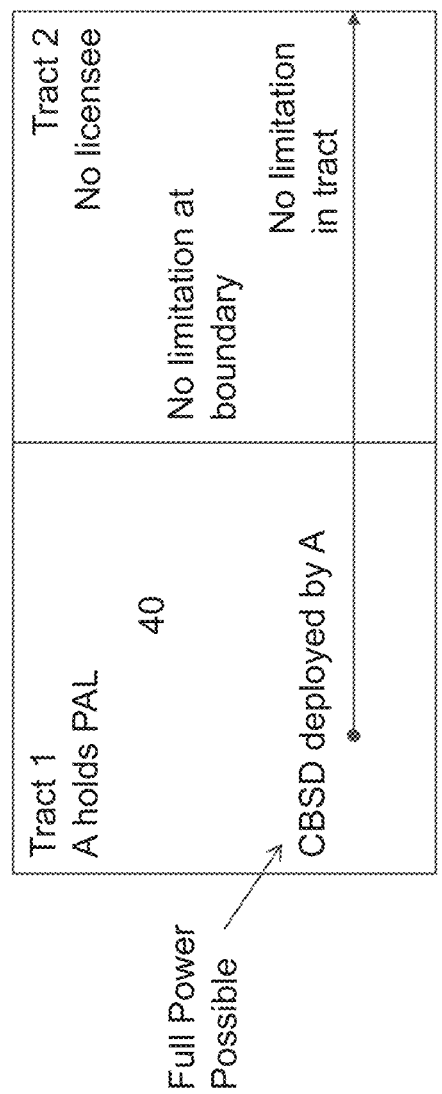
FIGS. 4A-C illustrate protection criteria for PALs.
Figure 4B:
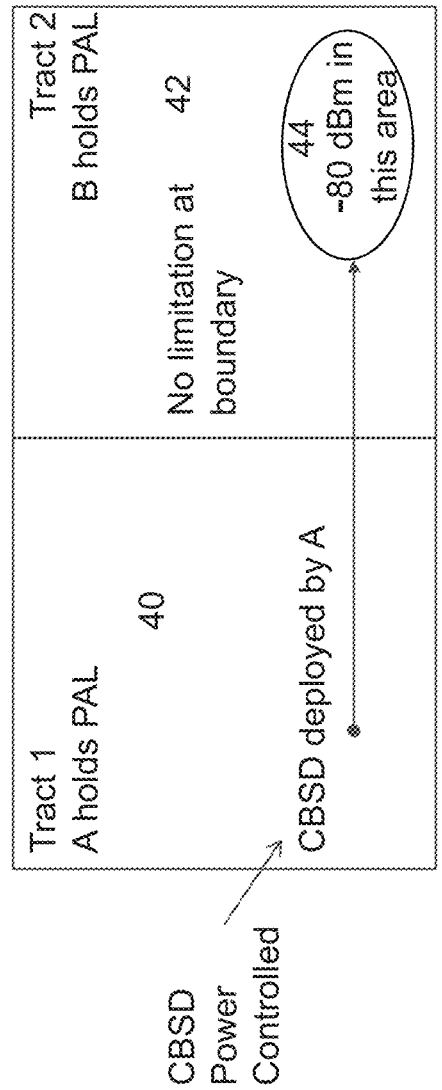
Figure 4C:
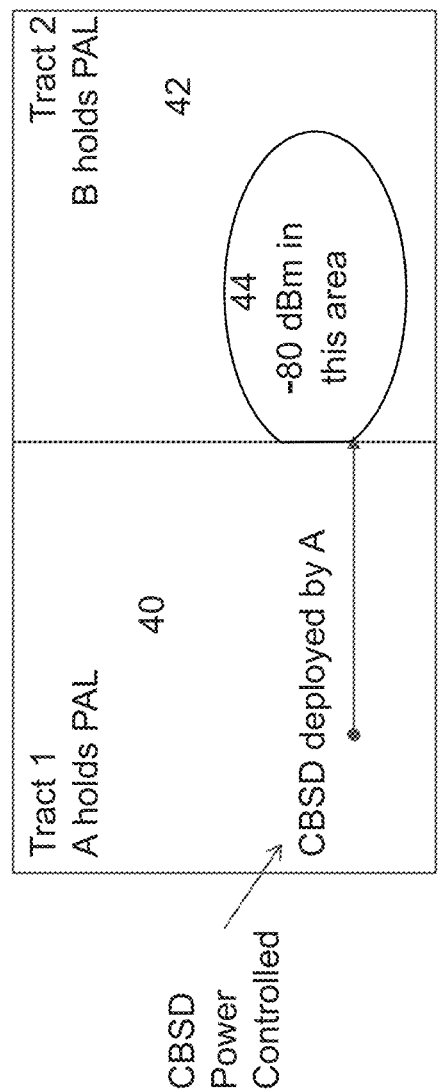

Spectrum is the lifeblood of modern cellular communication. Current building practices for wireless mobile communications focus on designing systems for wide area coverage in frequency bands that roughly extend between 400 MHz to 6 GHz. The traffic growth on mobile networks has grown to the point where the mobile industry is consistently starved for spectrum. Thus, improving access to spectrum by means of sharing of spectrum is of much interest to regulators.

In unlicensed bands, access to spectrum is usually opportunistic and sharing through polite coexistence. Sharing spectrum using licensed shared access (LSA) or authorized shared access (ASA) usually propose a division of rights of use, which may be based on time of use or geographical constraints between mobile operators and an incumbent user.

A typical use of this scenario is to enable use of a band that is available for licensed users in some markets, but is being restricted in others because of incumbents, such as radar or satellite systems. Incumbent systems can be protected around the area of deployment, while authorization for mobile infrastructure can be granted in such a way that aggregate interference from mobile systems towards the incumbent is limited to an acceptable level of noise rise or performance degradation. In LSA, the mobile operator is licensed to operate in permitted or authorized areas, and is the reasonable regulatory approach to ASA.

The introduction of licensed shared access (LSA) in the 2.3 GHz band facilitates binary sharing between the incumbent, namely terrestrial radar stations in e.g. France, and LTE with the aid of a spectrum repository known as the LSA repository.

In the United States, a Presidential Memorandum directing the FCC to identify federal spectrum for release to mobile services resulted in a report by the Presidential Council of Advisors on Science and Technology (PCAST) that recommended that spectrum held by the federal Government be released to the mobile industry in a three-tier sharing arrangement. This memorandum has resulted in FCC regulations codified in the Report and Order for the Citizen's Broadband Radio Service (CBRS) defined for the 3550-3700 MHz band.

As in the PCAST report, the CBRS defines three tiers of sharing, with higher tiers providing higher priority of access to spectrum than the lower ones. The assignment of channels to different tiers and related configurations are performed by a geolocation database and policy management system known as the Spectrum Access System (SAS).

In the CBRS, naval radar in littoral waters and commercial Fixed Satellite Service (FSS) comprise the incumbents. The second tier consists of Priority Access Licenses (PALs), and the third tier comprises opportunistic users known as general authorized access (GAA) users. Incumbent radar activity in the CBRS is dynamic, while FSS (space-to-earth) is static. The SAS is charged with protecting incumbents and PALs. In addition, the SAS authorizes spectrum for GAA users.

A SAS protects incumbents and higher tier users from interference using means such as propagation modeling and geographic or temporal isolation. Multiple SASs may serve different sets of CBSDs in the same geographical area. The interface between SASs may be used to share information regarding corresponding CBSD activity in a given geographical area.

A PAL user can protect a registered deployment of CBSDs within a PAL Protection Area (PPA) that is bounded by a contour representing a −96 dBm signal level. A PPA can overlap parts of multiple census tracts. While a PPA is atomically defined with respect to the coverage of a single CBSD, a composite PPA can be constructed by combining the coverage areas of geographically proximate CBSDs.

The SAS protects the PAL to an aggregate interference level of −80 dBm. A PAL is protected within the bounds of the PPA, but co-channel assignments to GAA users within the census tract are possible if the SAS can determine that the interference limits within the PPA will not be exceeded. Such frequency allocations may occur from several SASs, especially in census tracts within highly populated metropolitan areas.

One of the problems with protecting PAL use within registered PPAs is the distributed nature of spectrum allocation among multiple SASs to unrelated client CBSDs. The basic problem is that a PAL belongs to a specific licensee, who has a business relationship with a particular SAS. Yet, the rules allow other SASs to decide whether opportunistic or PAL use of co-channel and adjacent channel spectrum can occur in geographically proximate areas for unrelated CBSDs. Fully autonomous allocation of spectrum to CBSDs in the entire CBRS requires distributed agreement between multiple SASs on the level of interference in the PPA.

Particular embodiments obviate the problems described above and facilitate a SAS for administering a PAL to oversee and approve grants issued to CBSDs in the proximity of a protected CBSD. The embodiments described herein may improve consistency regarding interference computation and simplify protection of a CBSD holding a PAL license.

For example, S1 may be a SAS administering a PAL license L1 for CBSD-A. CBSD-A has acquired a grant of spectrum denoted as allocation X1 from S1. Once the PAL license is granted, S1 may publish the position of CBSD-A together with a protection area where any new grants are to be validated by S1.

CBSD-B may be in the proximity of CBSD-A, and has registered with SAS S2. CBSD-B may contact SAS S2 with a grant request. S2 will use the position of CBSD-B and determines that CBSD-B is within a predefined range from CBSD-A. The most suitable spectrum assignment for CBSD-B may happen to be an allocation X2 that will result in an interference rise within the passband of allocation X1 for CBSD-A. In this case, S2 may submit a grant approval request to S1.

S1 may use its own interference computation to validate that the grant proposed by S2 is not impacting CBSD-A operation, and will send a response back to S2. In doing so, S1 uses a compilation of information about other grants that may also exist in the area, possibly made by other SASs and including GAA or PAL interference from sources of interference that may have impact on the aggregate interference. S1 may use the information to estimate an expected interference rise from allocation X2. If S1 estimates the interference and noise level to be below a threshold (e.g., −80 dBm as suggested by the FCC Second Report and Order) for the CBRS, then allocation X2 may be approved. Otherwise the allocation is nominally denied. In some embodiments, S1 may propose parameter changes to S2 pertaining to allocation X2, such as a reduction of power or a change of bandwidth or frequency range.

Particular embodiments may create a strong relationship between a PAL licensee and its chosen serving SAS. The relationship enables the CBSDs in a PAL protection area (PPA) to be assured a quality to the spectrum allocation that is not possible with a completely autonomous approach to channel allocation among multiple SASs.

In particular embodiments, a first SAS is in control of a first PPA and is responsible for coexistence protection on behalf of its client. Some embodiments ensure that client privacy is not violated by sharing detailed information on all CBSDs among the entire set of SASs, but rather only the CBSDs deemed to be potential interferers to a PPA. Particular embodiments do not require each SAS to give up privacy for their clients if such a client must be accommodated in an area that will cause interference to a valid licensee of spectrum.

Particular embodiments may minimize data exchange. Some embodiments facilitate a distributed organization of SASs.

Particular embodiments may include a SAS that manages or validates aggregate interference calculation for associated PPAs. In some embodiments a centralized approach to the control may be used, while another approach may keep validation central, but uses distributed modeling of interference. Variations in the degree of autonomy have been identified.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 5-11B of the drawings, like numerals being used for like and corresponding parts of the various drawings. LTE is used throughout this disclosure as an example cellular system, but the ideas presented herein may apply to other wireless communication systems as well.

Figure 5:
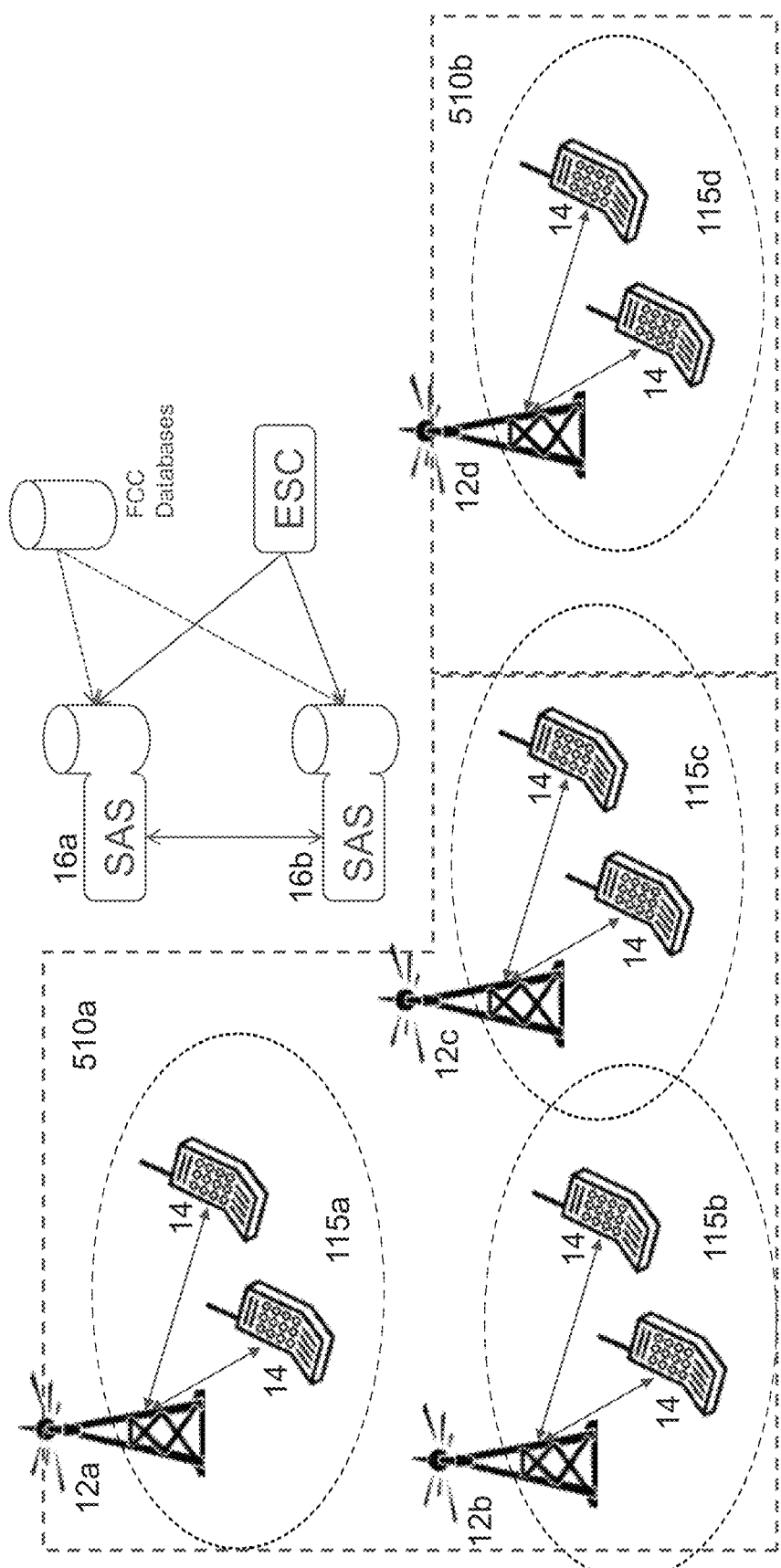
FIG. 5 is a block diagram illustrating example wireless networks and their associated spectrum access system (SAS) servers, according to some embodiments.

FIG. 5 is a block diagram illustrating example wireless networks and their associated spectrum access system (SAS) servers, according to some embodiments. The geographical area covered by SAS servers 16 includes tracts 510a and 510b. Each tract 510 includes one or more wireless networks 115. Each wireless network 115 may comprise a CBRS.

Each wireless network 115 includes network nodes 12 (such as base stations or eNodeBs) and wireless devices 14 (such as mobile phones, smart phones, laptop computers, tablet computers, MTC devices, or any other devices that can provide wireless communication). Network node 12 may comprise a CBSD, and wireless device 14 may comprise a CBRS end user device.

In general, wireless devices 14 that are within coverage of network node 12 (e.g., within coverage area 115 served by network node 12) communicate with network node 12 by transmitting and receiving wireless signals. For example, wireless devices 14 and network node 12 may communicate wireless signals containing voice traffic, data traffic, and/or control signals. Although each wireless network 115 is illustrated with a single network node 12 and two wireless devices 14, wireless network 115 may include any suitable number of network nodes 12 and wireless devices 14.

Each network node 12 may use any suitable radio access technology, such as long term evolution (LTE), 5G NR, LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

Each network node 12 may register with a SAS server 16. For example Network nodes 12a, 12c, and 12d may register with and be served by SAS server 16a. Network node 12b may register with and be served by SAS server 16b.

SAS server 16 is a geolocation database and a spectrum policy manager that is charged with interfacing with associated network nodes 12 (or a logical collection of network nodes 12). SAS server 16 protects incumbents and higher tier users from interference using means such as propagation modeling and geographic or temporal isolation. Multiple SAS servers 16 may communicate with each other to share information regarding corresponding network activity in a given geographical area.

In some embodiments, SAS 16a may receive, from SAS 16b, information about PPAs served by SAS 16b. Thus, SAS 16a has knowledge about the PPAs served by SAS 16b. The received information may include one or more of: a PPA boundary contour for each of the one or more PPAs; a frequency range allocated to each of the one or more PPAs; a number of CBSDs associated with each of the one or more PPAs; a location of CBSDs associated with each of the one or more PPAs; the power level of the CBSDs associated with each of the one or more PPAs, etc.

SAS 16a may receive a spectrum grant request on behalf of one of a first PPA or a first general authorized access (GAA) user. For example SAS 16a may receive a spectrum grant request from the operator of network 115c. The grant request may comprise messaging from components of network 115c, such as network node 12c, or the grant request may be in the form of user input to a user interface provided by SAS 16a, or any other suitable form of input. SAS 16a a may determine whether granting the spectrum grant request may interfere with a second PPA geographically proximate the one of the first PPA or the first GAA user, wherein the second PPA is served by SAS 16b. For example, SAS 16a may determine whether granting a spectrum grant request from the operator of network 115c might interfere with network 115b served by SAS 16b.

In some embodiments, SAS 16a may model the radio environment within network 115b and surrounding areas based on the spectrum grant request to determine an aggregate interference level. SAS 16a may determine the aggregate interference level exceeds an interference threshold (e.g., −80 dBm, or any other suitable threshold).

In particular embodiments, upon determining that granting the spectrum grant request may interfere with network 115b, SAS 16a may deny the spectrum grant request. In other embodiments, SAS 16a may send information about the spectrum grant request to SAS 16b for further evaluation. The information may include: a geographical location of a CBSD associated with the one of the first PPA or the first GAA user; a height of an antenna used by the CBSD; a power level of the CBSD; and a frequency allocation for the CBSD.

SAS 16b may determine whether granting the spectrum grant request by SAS 16a may interfere with network 115c. SAS 16b may send a authorize, deny, or modify response to SAS 16a. SAS 16a may grant, deny, or modify the spectrum grant request based on the response received from SAS 16b.

In some embodiments, upon SAS 16a determining that granting the spectrum grant request may not interfere with network 115c, SAS 16a may grant the spectrum grant request, and send information about the spectrum grant request to SAS 16b.

SAS 16b may determine whether the spectrum granted by SAS 16a may interfere with network 115c. SAS 16b may send a modify or revoke response to SAS 16a. SAS 16a may modify or revoke the spectrum grant based on the response received from SAS 16b. Particular examples are described in more detail with respect to FIGS. 6-10.

SAS server 16 may include any suitable combination of hardware and/or software. For example, in particular embodiments, a SAS server, such as SAS server 16, may include the components described with respect to FIG. 11A below.

Figure 6:
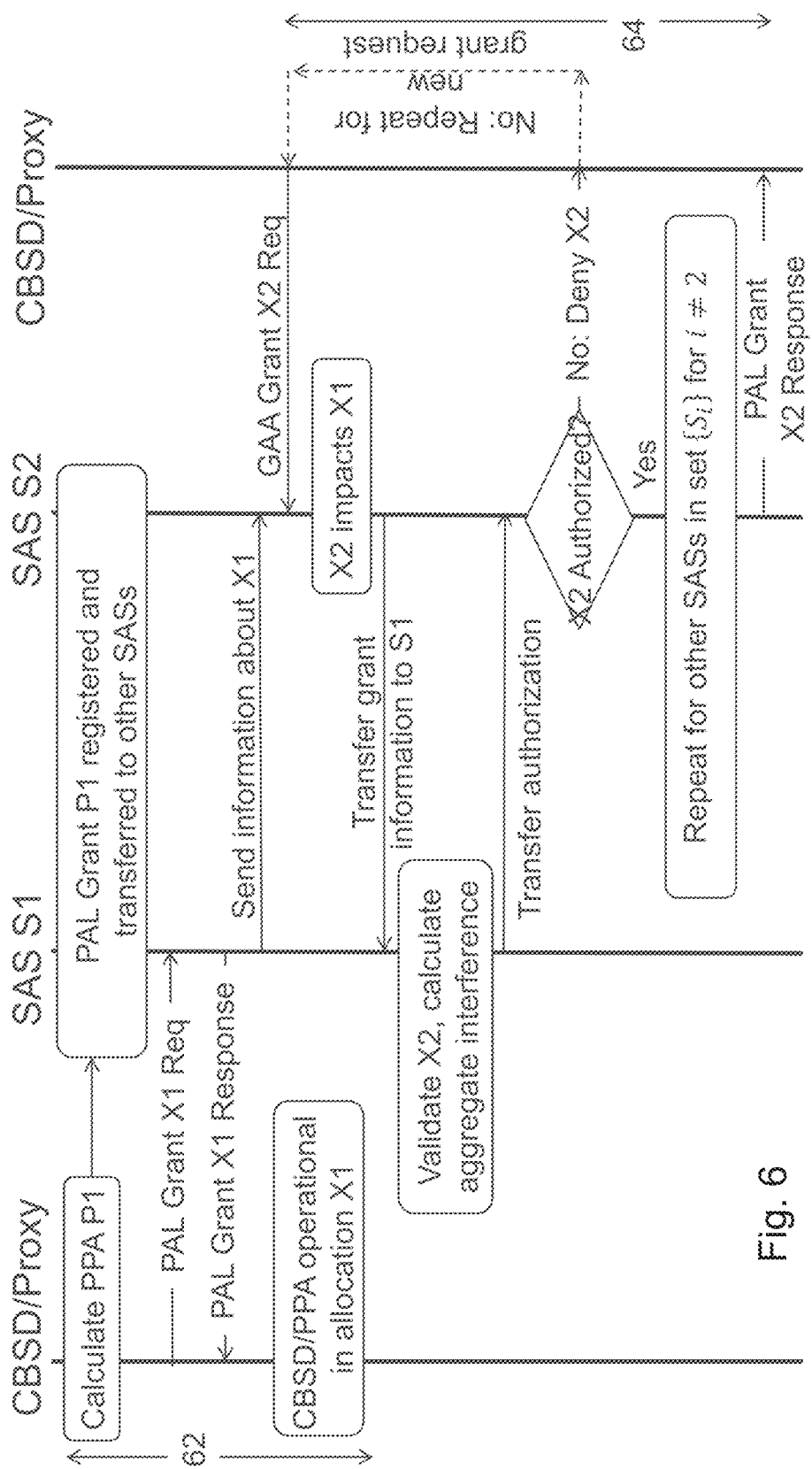
FIGS. 6-8 are sequence diagrams illustrating example message exchanges between two SAS, according to particular embodiments.
Figure 7:
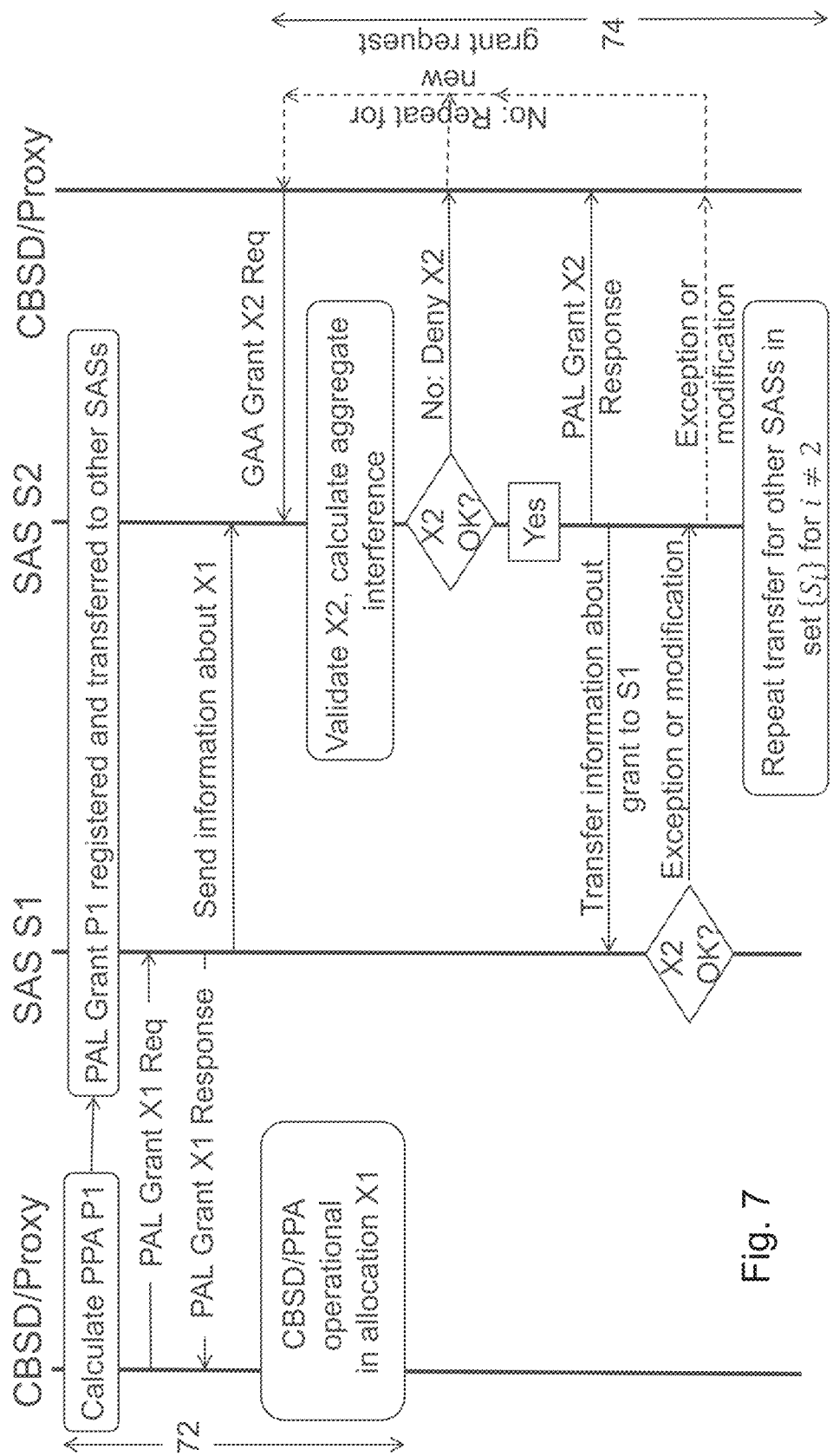
Figure 8:
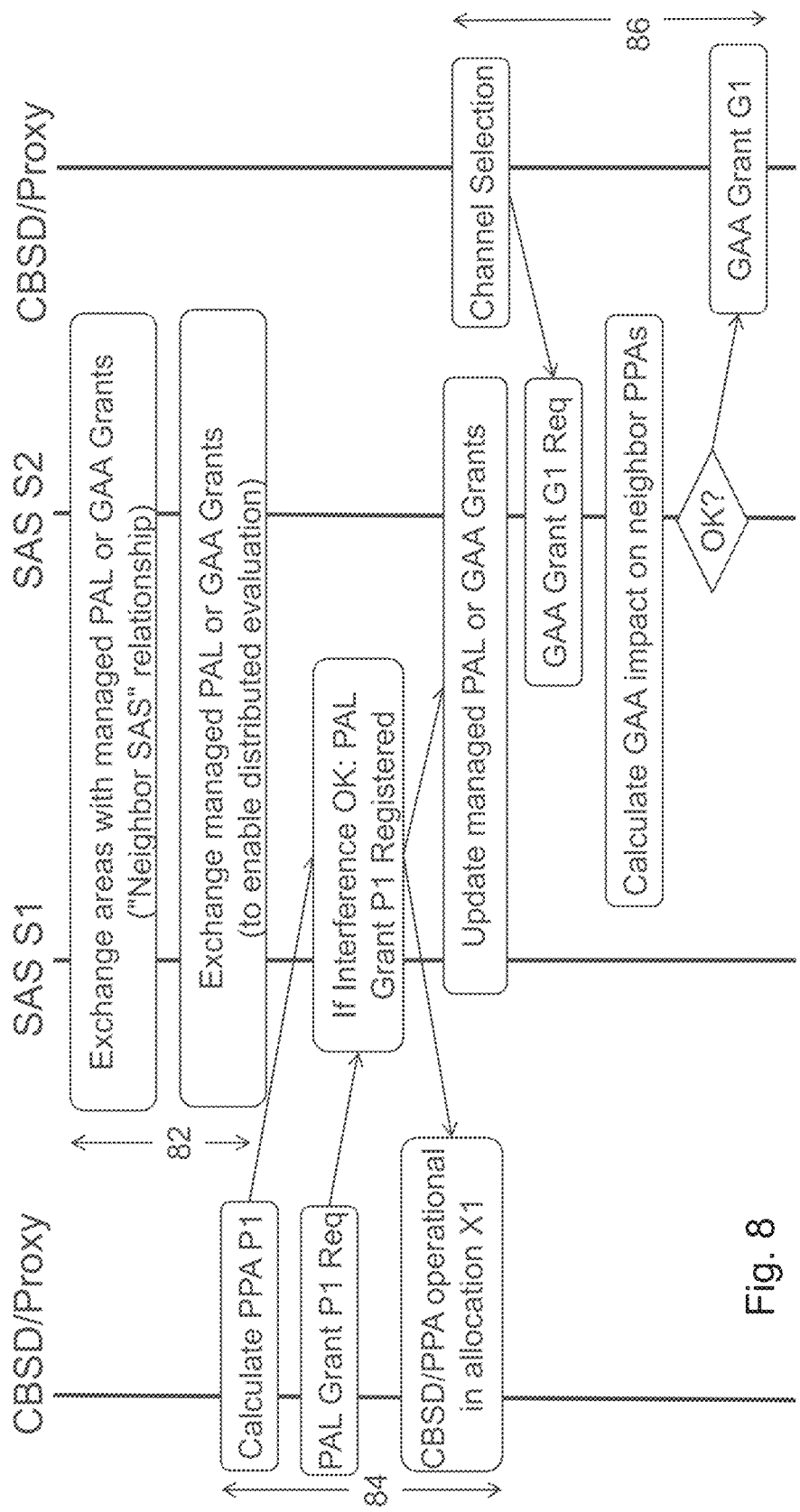

Particular embodiments include a relaxation of the distributed approach to channel allocation. FIGS. 6-8 are sequence diagrams illustrating example message exchanges between two SAS, according to particular embodiments.

FIG. 6 includes message exchanges between SAS S1 serving a first CBSD/Proxy and SAS S2 serving a second CBSD/Proxy. At step 62, a CBSD or a set of CBSDs within PPA P1 establishes a relationship with SAS S1 to administer a PAL. SAS S1 validates the PPA, and informs other SASs (such as SAS S2) of the characteristics of the PPA. This involves providing information about the PPA boundary contour (e.g., as polygon vertices on a map), within which no unrelated CBSD may be deployed, the frequency range of the allocation X1 that has been granted to nodes in the PPA, and optionally, information about the number of radio nodes in the PPA (each potentially corresponding to a CBSD), the location of those nodes and the configured power level of each node as an average or an exact value.

In addition, the serving SAS S1 for PPA P1 may assume control of coexistence management for PPA P1. Thus, as illustrated by step 64, when a second SAS S2 seeks to perform a channel assignment X2 in a census tract to another PPA P2 or to a GAA user G1, and it is likely that the assignment X2 will cause a residual interference rise in PPA P1, SAS S2 may share the characteristics of PPA P2 or GAA G1 with SAS S1 and seek validation of the allocation. The shared characteristics include CBSD location, height of antenna above ground, the power level, and the proposed allocation X2.

In some embodiments, the SASs share information of areas where they manage PPAs and GAAs, so that other SASs know which other SASs to seek validation with. This is because a SAS is not unique in any given location and SAS operators operate in a competitive mode.

As illustrated by step 64, SAS S2 models the environment within PPA P1 and surrounding areas, including the deployment area of either PPA P2 or GAA G1 as the case may be. If the modeling and calculation of interference in S2 indicates possible impact to PPA P1, data of the source CBSDs is shared with SAS S1. The calculated incremental interference from the new allocation is added to the registered information of other cochannel users in close proximity and the aggregate interference is calculated in S1.

The aggregate interference is nominally calculated as $\Sigma_N P_n G_n$, where N corresponds to the total number of sources of interference, $P_n$ corresponds to the power of each source, and $G_n$ represents the total gain in the channel that corresponds to an expected average received signal level. Many ways exist to determine the component of $G_n$ that corresponds to path loss, based on models that are, for example, terrain or site specific, or based on empirical models such as the Okumura-Hata model adapted to the frequency band or the Irregular Terrain Model (ITM).

If the aggregate interference level as calculated by the summation exceeds −80 dBm, for example, SAS S1 may send an invalid indication to SAS S2, and the allocation in S2 is not carried out. Alternatively, SAS S1 may suggest a modification of the allocation X2 that may meet interference limits. If, on the other hand, the aggregate interference within the PPA P1 does not exceed −80 dBm, for example, SAS S2 may receive a validation of the allocation X and the CBSD is subsequently authorized by SAS S2 to operate on the associated frequency.

In some embodiments, the interference level of −80 dBm may be excessive. The chosen interference criterion may be a different signal level if regulators change the rules, or may be a composite of factors such as loading of the spectrum and achieved or modeled spectral efficiency normalized with respect to a non-sharing deployment. The level of loading may be monitored by SASs based on feedback from networks deployed in a census tract.

An advantage of the examples described with respect to FIG. 6 is that they facilitate the CBSDs in a PPA to be assured a quality to the spectrum allocation that is not possible with a completely autonomous approach to channel allocation among multiple SASs. Furthermore, some embodiments may only exchange information between SASs when one SAS determines a potential spectrum access request may interfere with an existing grant. This minimizes the amount of data exchange and protects information privacy when interference is not an issue.

FIG. 7 includes another message exchange between SAS S1 serving a first CBSD/Proxy and SAS S2 serving a second CBSD/Proxy. The example embodiment illustrated in FIG. 7 maintains, to the extent possible, the distributed nature of the CBRS coexistence management and the autonomy of different SASs. The SAS is charged with validating the associated PAL holders PPA, and informs other SASs of the characteristics of the PPA.

At step 72 (similar to step 62 of FIG. 6), a CBSD or a set of CBSDs within PPA P1 establishes a relationship with SAS S1 to administer a PAL. SAS S1 validates the PPA, and informs other SASs (such as SAS S2) of the characteristics of the PPA.

At step 74, SAS S2 receives grant request X2. SAS S2 performs an aggregate interference calculation and confirms that its modeled calculation results in an aggregate interference level that does not exceed −80 dBm, for example, at any PPA Pn. SAS S2 then makes the assignment X2 to the PPA P2 or the GAA G1 (as the case may be) and logs the decision with SAS S1 along with information about the deployment characteristics of the interference source.

In some embodiments, SAS S1 retains information about all the allocations Xn that contribute to interference rise at the PPA. SAS S1 then validates the allocation X2 by performing an aggregate interference calculation based on the incremental contribution of allocation X2 and prior knowledge of the other allocations that impact its own service quality towards the client corresponding to PPA P1. This information is further shared with all SASs that have client CBSDs in the geographical areas proximate to PPA P1. Aggregate interference calculations may be done by SAS S2, and subsequently validated by SAS S1.

An advantage of the examples described with respect to FIG. 7 is that the SAS exercises a greater amount of autonomy, but the interference may still be mitigated by input from an adjacent or nearby SAS.

FIG. 8 includes another message exchange between SAS S1 serving a first CBSD/Proxy and SAS S2 serving a second CBSD/Proxy. The example embodiment illustrated in FIG. 8 includes negotiated access to spectrum across multiple PPAs. The coexistence situation involves cochannel or adjacent channel use of two unrelated PPAs, PPA P1 administered by SAS S1 and PPA P2 administered by SAS S2.

In some embodiments, different SASs accommodate the mutual need to serve clients in their respective PPAs in geographically proximate locations. At step 82, two SASs such as SAS S1 and SAS S2, exchange information about their respective PPAs and the procedures described with respect to FIG. 6 may be carried out by the respective SASs for their client PPAs. For example, SAS S1 and S2 may exchange information about geographic areas with managed PAL or GAA grants and the spectrum allocated in those areas.

At step 82, a first CBSD/Proxy requests grant P1 from SAS S1. At step 84, a second CBSD/Proxy requests grant G1 from SAS S2.

An exception is raised if either of the SASs S1 or S2 determines a rise in aggregate interference level that exceeds −80 dBm, for example. If one of the SASs (e.g., SAS S1) has already established an operational PPA, the attempt by S2 may be denied by mutual consent. In the case of simultaneous allocation, particular embodiments may use manual intervention to resolve conflicts. In other embodiments, the two SASs may conduct a message exchange that randomly chooses a winner for a simulated coin toss, and the allocation X is made by the winning SAS (e.g., SAS S2) to its client PPA P2. Other games designed to resolve conflicts will be obvious to those of skill in the art.

In some embodiments, the allocation should is sent to the corresponding clients of SAS S2 after validation. Other embodiments may send an asynchronous allocation pending validation. In the latter case, reconfiguration of allocation X may be performed if the validation does not succeed.

An advantage of the examples described with respect to FIG. 8 is that the SAS exercises the greatest amount of autonomy, at the cost of increased data exchange and loss of privacy between the multiple SAS.

In some embodiments, a delegated authority may validate spectrum grants. For example, several SASs may end up managing PAL licenses in the same track region. A delegation of authority may include a SAS that becomes the primary license authority and the other SAS act as proxies towards the main SAS. This may be negotiated between the SAS providers and may take into account the capacity that a SAS can handle.

Some embodiments may include steady state snapshots. Periodically, when a steady state is reached, the SASs may trigger a snapshot recording of the assigned licenses and the CBSD deployment info. If for some reason (sudden incumbent activity or massive new CBSD grant requests) the state starts to fluctuate, the CBSDs may decide to revert to the recorded steady state. To achieve this, the SASs may invalidate the current grants and may suggest to the CBSDs on what grant(s) to request, so that the grants match with the grants from the steady state.

Figure 9:
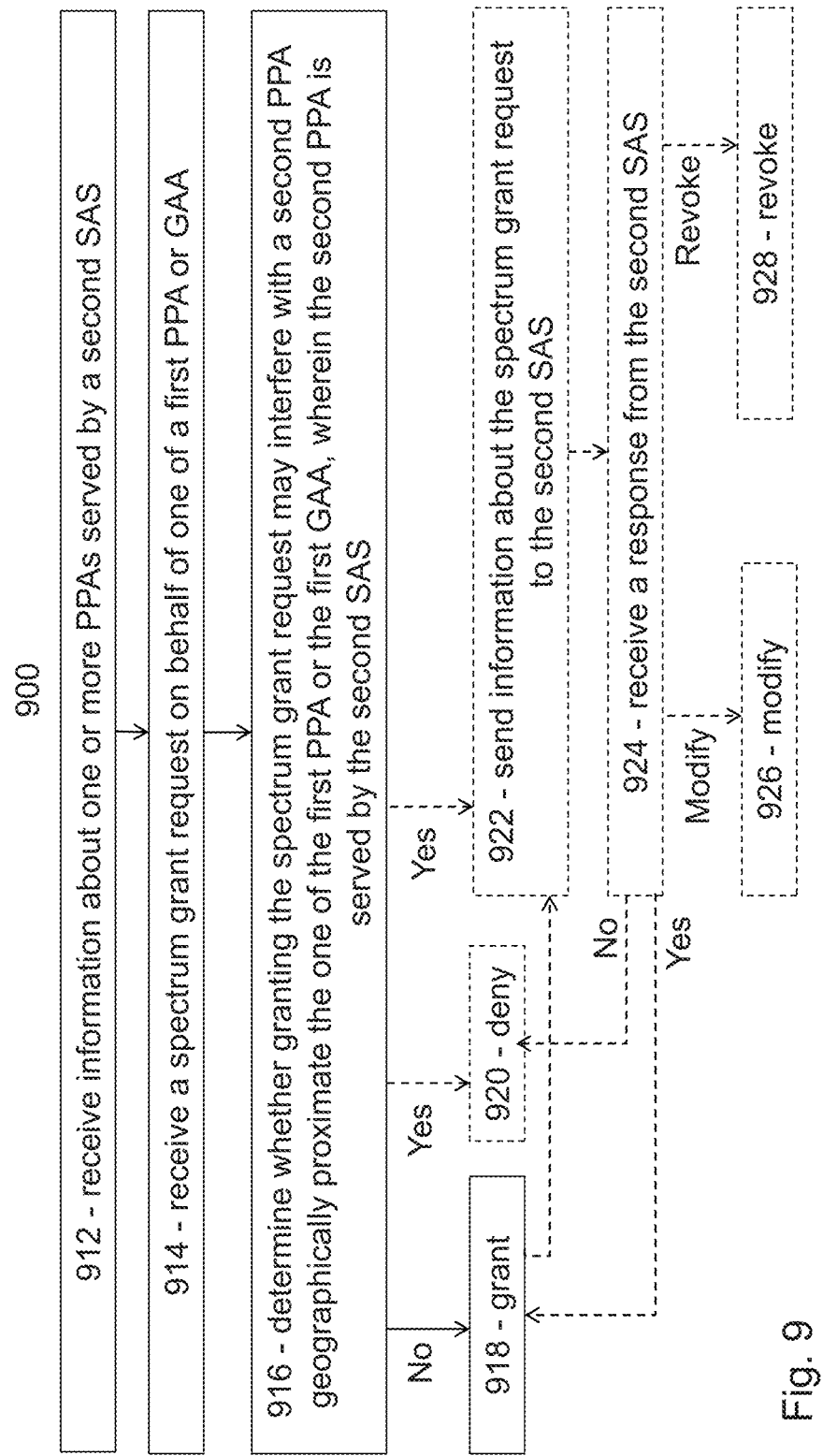

The steps performed by the SAS in the examples described with respect to FIGS. 6-8 may be generally represented by the flowcharts in FIGS. 9 and 10.

FIG. 9 is a flow diagram illustrating an example method in a SAS server, according to some embodiments. In particular embodiments, one or more steps of FIG. 9 may be performed by SAS server 16 described with respect to FIG. 5.

The method begins at step 912, where the SAS server receives information about one or more PPAs served by a second SAS server. For example, SAS server 16a may receive information about network 115b from SAS server 16b. In some embodiments, the received information may include a PPA boundary contour for each of the one or more PPAs; a frequency range allocated to each of the one or more PPAs; a number of CBSDs associated with each of the one or more PPAs; a location of CBSDs associated with each of the one or more PPAs; and the power level of the CBSDs associated with each of the one or more PPAs. Additional details regarding receiving information about one or more PPAs are described with respect to step 62 of FIG. 6, step 72 of FIG. 7, and step 82 of FIG. 8.

At step 914, the SAS server receives a spectrum grant request on behalf of one of a first PPA or GAA. For example, SAS server 16a may receive a grant request on behalf of a PPA or GAA for network 115c. Additional details regarding receiving spectrum grant request are described with respect to step 64 of FIG. 6, step 74 of FIG. 7, and steps 84 and/or 86 of FIG. 8.

In some embodiments, SAS server 16a may receive the grant request from components of network 115c (e.g., network node 12c, or any suitable network management node of network 115c). In some embodiments, an operator of network 115c may input the grant request to SAS server 16a through a user interface, or cause an operator of SAS 16a to input the request. At step 916, the SAS server determines whether granting the spectrum grant request may interfere with a second PPA geographically proximate the one of the first PPA or the first GAA, wherein the second PPA is served by the second SAS server. For example, SAS server 16a may determine whether granting the request on behalf of network 115c may interfere with network 115b served by SAS server 16b.

In particular embodiments, to determine whether granting the spectrum grant request may interfere with the second PPA, SAS server 16a may model the radio environment within the network 115b and surrounding areas based on the spectrum grant request to determine an aggregate interference level. SAS server 16a may determine whether the aggregate interference level exceeds an interference threshold (e.g., −80 dBm).

If the SAS server determines granting the request will not interfere with the second PPA, then the method continues to step 918 where the SAS server grants the spectrum grant request. For example, SAS server 16a may communicate an authorization message to components of network 115c (e.g., network node 12c, or any suitable network management node of network 115c), or to an operator of network 115c through a user interface.

In some embodiments, the method may end at step 918. In other embodiments, the method may continue to step 922, where the SAS server sends information about the spectrum grant request to the second SAS server. For example, SAS server 16a may send information about the spectrum grant request to SAS server 16b. The information may include: a geographical location of a CBSD associated with the one of the first PPA or the first GAA user; a height of an antenna used by the CBSD; a power level of the CBSD; and a frequency allocation for the CBSD.

In some embodiments, the second SAS server may update its database of information regarding geographically proximate PPAs. The second SAS server may use the information for granting or denying subsequently received grants (e.g., as described with respect to FIG. 8).

In some embodiments, the second SAS server may perform its own interference modeling and calculations using the received information about the spectrum grant request. The modeling performed by the second SAS server may arrive at a different result than the modeling performed by the first SAS server. For example, one SAS server may have more, less, or different information than another SAS server, resulting in different calculations.

If the second SAS determines the previously granted request may cause interference, the method may continue to step 926, where the second SAS server sends a modification response to the first SAS server. For example, the second SAS server may suggest modifications to particular request parameters (e.g., frequency, power levels, etc.) so that the grant does not interfere with an existing grant (e.g., as described with respect to FIG. 7).

In other embodiments, the method may continue to step 928, where second SAS server sends a revoke response to the first SAS server. For example, the second SAS server may request the first SAS server to revoke the grant because the grant interferes with an existing grant managed by the second SAS server (e.g., as described with respect to FIG. 7).

Returning to step 916, if the SAS server determines granting the request may interfere with the second PPA, then in some embodiments the method continues to step 920 where the SAS server denies the spectrum grant request (e.g., as described with respect to FIG. 8). In some embodiments, the method continues to step 922, where the where the SAS server sends information about the spectrum grant request to the second SAS server (e.g., as described with respect to FIG. 6).

As described above, the second SAS server may perform its own interference modeling and calculations using the received information about the spectrum grant request. If the second SAS determines that granting the request may cause interference, the method may continue to step 926, where the second SAS server sends a modification response to the first SAS server, or to step 920, where the second SAS server sends a deny response to the first SAS server (e.g., as described with respect to FIG. 6).

Upon receiving the modify or deny response, in some embodiments the first SAS server may determine whether to modify or revoke a previous grant. In some embodiments, the first SAS server may override the response from the second SAS server and may not modify or revoke the previous grant.

Modifications, additions, or omissions may be made to method 900. Additionally, one or more steps in method 900 of FIG. 9 may be performed in parallel or in any suitable order. The steps of method 900 may be repeated over time as necessary.

FIG. 10 is a flow diagram illustrating another example method in a SAS server, according to some embodiments. In particular embodiments, one or more steps of FIG. 10 may be performed by SAS server 16 described with respect to FIG. 5.

The method begins at step 1012, where a first SAS server receives information about a spectrum grant request on behalf of a first PPA served by a second SAS that is geographically proximate to at least one PPA served by the first SAS server. For example, SAS server 16b may receive information about a spectrum grant request on behalf of network 115c served by SAS server 16a, which is geographically proximate network 115b served by SAS server 16b.

At step 1014, the SAS server determines whether granting the spectrum grant request by the second SAS may interfere with the at least one PPA served by the first SAS. For example, SAS server 16b may determine whether granting of the spectrum grant request by SAS server 16a may interfere with network 115b.

In some embodiments, determining whether granting the spectrum grant request by the second SAS may interfere with the at least one PPA served by the first SAS comprises modeling the radio environment within the second PPA and surrounding areas based on the received information about the spectrum grant request to determine an aggregate interference level, and determining the aggregate interference level exceeds an interference threshold (e.g., −80 dBm).

At step 1016, the SAS server send a authorize, deny, modify, or revoke response to the second SAS. For example, if the aggregate interference level does not exceed the threshold, SAS server 16b may send an authorization request to SAS server 16a.

Modifications, additions, or omissions may be made to method 1000. Additionally, one or more steps in method 1000 of FIG. 10 may be performed in parallel or in any suitable order. The steps of method 1000 may be repeated over time as necessary.

Figure 11B:
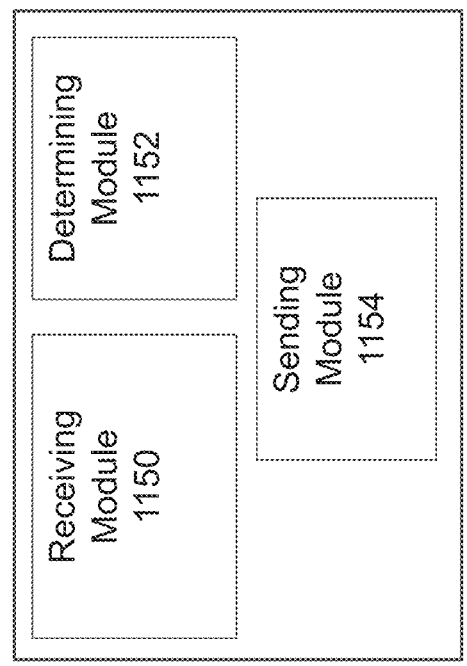
FIG. 11B is a block diagram illustrating example components of a SAS server.
Figure 11A:
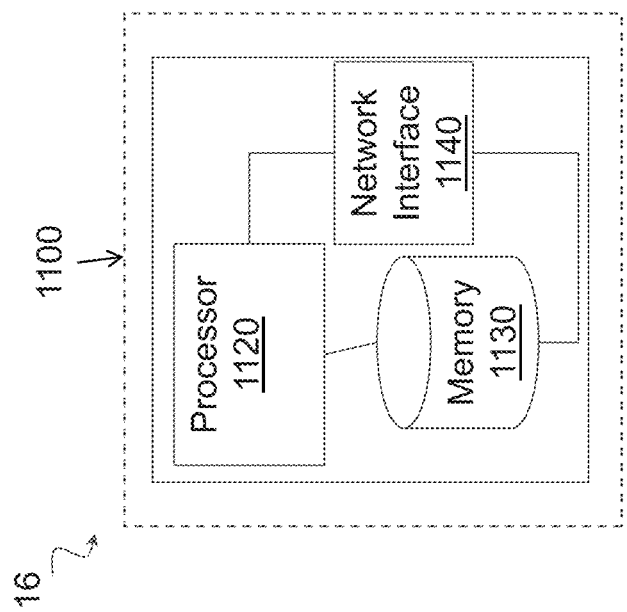
FIG. 11A is a block diagram illustrating an example embodiment of a SAS server.

FIG. 11A is a block diagram illustrating an example embodiment of a SAS server. The SAS server is an example of SAS server 16 illustrated in FIG. 5. In particular embodiments, the SAS server is capable of calculating aggregate interference based on a spectrum grant request to determine whether to grant the spectrum grant request. The SAS server may communicate information about the spectrum grant request to other SAS servers.

The SAS server includes processing circuitry 1100. Processing circuitry 1100 includes at least one processor 1120, at least one memory 1130, and at least one network interface 1140. In some embodiments, processor 1120 executes instructions to provide some or all of the functionality described herein as provided by the SAS server. Memory 1130 stores the instructions executed by processor 820. Memory 1130 also stores information about PPA and PALs managed by the SAS server. Network interface 1140 communicates signals to other network components, such as a gateway, switch, router, Internet, Public Switched Telephone Network (PSTN), controller, network nodes 12, and other SAS servers 16.

Processor 1120 includes any suitable combination of hardware and software implemented in one or more integrated circuits or modules to execute instructions and manipulate data to perform some or all of the described functions of the SAS server. In some embodiments, processor 1120 may include, for example, one or more computers, one more programmable logic devices, one or more central processing units (CPUs), one or more microprocessors, one or more applications, and/or other logic, and/or any suitable combination of the preceding. Processor 1120 may include analog and/or digital circuitry configured to perform some or all of the described functions of SAS server 16. For example, processor 1120 may include resistors, capacitors, inductors, transistors, diodes, and/or any other suitable circuit components.

Memory 1130 is generally operable to store computer executable code and data. Examples of memory 1130 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and refers to any suitable device operable to receive input for SAS server 16, send output from SAS server 16, perform suitable processing of the input or output or both, communicate to other devices, or any combination of the preceding. Network interface 1140 includes appropriate hardware (e.g., port, modem, network interface card, etc.) and software, including protocol conversion and data processing capabilities, to communicate through a network.

In particular embodiments, processor 1120 in communication with transceiver 1110 calculates aggregate interference based on a spectrum grant request to determine whether to grant the spectrum grant request, and may communicate information about the spectrum grant request to other SAS servers.

Other embodiments of the SAS server may include additional components (beyond those shown in FIG. 11A) responsible for providing certain aspects of the SAS server's functionality, including any of the functionality described above and/or any additional functionality (including any functionality necessary to support the solution described above).

FIG. 11B is a block diagram illustrating example components of SAS server 16. The components may include receiving module 1150, determining module 1152, and sending module 1154.

Receiving module 1150 may perform the receiving functions of SAS server 16. For example, receiving module 1150 may receive spectrum grant requests on behalf of a PPA, or receive information about a spectrum grant request from another SAS server 16. In some embodiments, receiving module 1150 may receive grant, deny, modify, or request responses from another SAS server 16. Receiving module 1150 may perform any of the receiving functions described with respect to FIGS. 5-10. In certain embodiments, receiving module 1150 may include or be included in processor 1120. In particular embodiments, receiving module 1150 may communicate with determining module 1152 and sending module 1154.

Determining module 1152 may perform the determining functions of SAS server 16. For example, determining module 1152 may determine whether granting a spectrum grant request may interfere with existing grants. Determining module 1152 may perform any of the determining functions described with respect to FIGS. 5-10. In certain embodiments, determining module 1152 may include or be included in processor 1120. In particular embodiments, determining module 1152 may communicate with receiving module 1150 and sending module 1154.

Sending module 1154 may perform the sending functions of SAS server 16. For example, sending module 1154 may send spectrum grants responses on behalf of a PPA, or send information about a spectrum grant request to another SAS server 16. In some embodiments, sending module 1154 may send grant, deny, modify, or request responses to another SAS server 16. Sending module 1154 may perform any of the sending functions described with respect to FIGS. 5-10. In certain embodiments, sending module 1154 may include or be included in processor 1120. In particular embodiments, sending module 1154 may communicate with receiving module 1150 and determining module 1152.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
ASA Authorized Shared Access
BTS Base Transceiver Station
CBRS Citizen's Broadband Radio Service
CBSD Citizen's Broadband radio Service Device
D2D Device to Device
DL Downlink
EDGE Enhanced Data rates for Global Evolution
eNB eNodeB
ESC Environmental Sensing Component
E-UTRA Evolved Universal Terrestrial Radio Access
FDD Frequency Division Duplex
FSS Fixed Satellite Service
GAA General Authorized Access
GERAN GSM/EDGE Radio Access Network
GSM Global System for Mobile communication
HSPA High Speed Packet Access
IMT International Mobile Telecommunications
ITU International Telecommunications Union
LSA Licensed Shared Access
LTE Long Term Evolution
MAC Medium Access Control
M2M Machine to Machine
MIMO Multi-Input Multi-Output
MTC Machine Type Communication
NR New Radio
PAL Priority Access License (Licensee)
PCAST Presidential Council of Advisors on Science and Technology
PPA PAL Protection Area
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
SAS Spectrum Access System
UE User Equipment
UMTS Universal Mobile Telecommunications Service
UTRAN Universal Terrestrial Radio Access Network
WAN Wireless Access Network
WCDMA Wideband Code Division Multiple Access

The invention claimed is:

1. A method for use in a first spectrum access system (SAS) server of authorizing spectrum access, the method comprising:
   receiving, from a second SAS, information about one or more priority access license (PAL) protection areas (PPAs) served by the second SAS;
   receiving a spectrum grant request on behalf of one of a first PPA or a first general authorized access (GAA) user;
   determining whether granting the spectrum grant request is likely to interfere with a second PPA geographically proximate the one of the first PPA or the first GAA user, wherein the second PPA is served by the second SAS; and
   granting or denying the spectrum grant request based at least in part on the determination of whether granting the spectrum grant request is likely to interfere with the second PPA.

2. The method of claim 1, wherein the received information about the one or more PPAs served by the second SAS comprises one or more of:
   a PPA boundary contour for one of the one or more PPAs;
   a frequency range allocated to one of the one or more PPAs;
   a number of citizen's band service devices (CBSDs) associated with one of the one or more PPAs;
   a location of a CBSD associated with one of the one or more PPAs; and
   a power level of a CBSD associated with one of the one or more PPAs.

3. The method of claim 1, wherein determining whether granting the spectrum grant request is likely to interfere with the second PPA comprises:

modeling the radio environment within the second PPA and surrounding areas based on the spectrum grant request to determine an aggregate interference level; and determining the aggregate interference level exceeds an interference threshold.

4. The method of claim 3, wherein modeling the radio environment comprises selectively applying one of an Okumura-Hata model or an Irregular Terrain Model (ITM).

5. The method of claim 3, wherein the interference threshold is −80 dBm.

6. The method of claim 1, further comprising:

upon determining that granting the spectrum grant request is likely to interfere with the second PPA, sending information about the spectrum grant request to the second SAS;

receiving, from the second SAS, a spectrum grant response authorizing or denying the spectrum grant request; and granting or denying the spectrum grant request based on the response from the second SAS.

7. The method of claim 6, wherein the information about the spectrum grant request comprises one or more of:

a geographical location of a CBSD associated with the one of the first PPA or the first GAA user;

a height of an antenna used by the CBSD;

a power level of the CBSD; and a frequency allocation for the CBSD.

8. The method of claim 1, further comprising:

upon determining that granting the spectrum grant request is likely to interfere with the second PPA:

denying the spectrum grant request;

upon determining that granting the spectrum grant request is likely to not interfere with the second PPA:

granting the spectrum grant request; and sending information about the spectrum grant request to the second SAS.

9. The method of claim 7, further comprising:

receiving, from the second SAS, a spectrum grant response denying or modifying the spectrum grant request; and determining whether to revoke or modify the granted spectrum grant request.

10. The method of claim 1, further comprising sending information about the spectrum grant request to the second SAS, wherein the second SAS is a neighbor of the first SAS server.

11. A first spectrum access system (SAS) server operable to authorize spectrum access, the first SAS server comprising a memory coupled to a processor, the processor operable to:

receive, from a second SAS, information about one or more priority access license (PAL) protection areas (PPAs) served by the second SAS;

receive a spectrum grant request on behalf of one of a first PPA or a first general authorized access (GAA) user;

determine whether granting the spectrum grant request is likely to interfere with a second PPA geographically proximate the one of the first PPA or the first GAA user, wherein the second PPA is served by the second SAS; and grant or deny the spectrum grant request based at least in part on the determination of whether granting the spectrum grant request is likely to interfere with the second PPA.

12. The SAS of claim 11, wherein the received information about the one or more PPAs served by the second SAS comprises one or more of:

a PPA boundary contour for one of the one or more PPAs;

a frequency range allocated to one of the one or more PPAs;

a number of citizen's band service devices (CBSDs) associated with one of the one or more PPAs;

a location of a CBSD associated with one of the one or more PPAs; and a power level of a CBSD associated with one of the one or more PPAs.

13. The SAS of claim 11, wherein the processor operable to determine whether granting the spectrum grant request is likely to interfere with the second PPA is operable to:

model the radio environment within the second PPA and surrounding areas based on the spectrum grant request to determine an aggregate interference level; and determine the aggregate interference level exceeds an interference threshold.

14. The SAS of claim 13, wherein the processor is operable to model the radio environment by selectively applying one of an Okumura-Hata model or an Irregular Terrain Model (ITM).

15. The SAS of claim 13, wherein the interference threshold is −80 dBm.

16. The SAS of claim 11, the processor further operable to:

upon determining that granting the spectrum grant request is likely to interfere with the second PPA, send information about the spectrum grant request to the second SAS;

receive, from the second SAS, a spectrum grant response authorizing or denying the spectrum grant request; and grant or deny the spectrum grant request based on the response from the second SAS.

17. The SAS of claim 16, wherein the information about the spectrum grant request comprises one or more of:

a geographical location of a CBSD associated with the one of the first PPA or the first GAA user;

a height of an antenna used by the CBSD;

a power level of the CBSD; and a frequency allocation for the CBSD.

18. The SAS of claim 11, the processor further operable to:

upon determining that granting the spectrum grant request is likely to interfere with the second PPA:

deny the spectrum grant request;

upon determining that granting the spectrum grant request is likely to not interfere with the second PPA:

grant the spectrum grant request; and send information about the spectrum grant request to the second SAS.

19. The SAS of claim 18, the processor further operable to:

receive, from the second SAS, a spectrum grant response denying or modifying the spectrum grant request; and determine whether to revoke or modify the granted spectrum grant request.

20. The SAS of claim 11, the processor further operable to send information about the spectrum grant request to the second SAS, wherein the second SAS is a neighbor of the first SAS server.

* * * * *